United States Patent
Hernandez et al.

(10) Patent No.: US 8,033,114 B2
(45) Date of Patent: Oct. 11, 2011

(54) MULTIMODE FUEL INJECTOR FOR COMBUSTION CHAMBERS, IN PARTICULAR OF A JET ENGINE

(75) Inventors: Didier Hippolyte Hernandez, Quiers (FR); Thomas Olivier Marie Noel, Vincennes (FR)

(73) Assignee: SNECMA, Paris (FR)

( * ) Notice: Subject to any disclaimer, the term of this patent is extended or adjusted under 35 U.S.C. 154(b) by 1289 days.

(21) Appl. No.: 11/620,314

(22) Filed: Jan. 5, 2007

(65) Prior Publication Data
US 2007/0169486 A1    Jul. 26, 2007

(30) Foreign Application Priority Data
Jan. 9, 2006 (FR) .................................. 06 50071

(51) Int. Cl.
*F02C 1/00* (2006.01)
*B05B 7/10* (2006.01)
(52) U.S. Cl. .............................. 60/748; 60/737; 239/402
(58) Field of Classification Search .................... 60/776, 60/748, 737, 740, 742, 746, 747; 239/399–406
See application file for complete search history.

(56) References Cited

U.S. PATENT DOCUMENTS

| | | | |
|---|---|---|---|
| 6,189,320 B1 | 2/2001 | Poeschl et al. | |
| 6,289,677 B1 * | 9/2001 | Prociw et al. | ................... 60/748 |
| 6,418,726 B1 | 7/2002 | Foust et al. | |
| 6,539,724 B2 | 4/2003 | Cornwell et al. | |
| 6,834,505 B2 * | 12/2004 | Al-Roub et al. | ................. 60/737 |
| 7,143,583 B2 * | 12/2006 | Hayashi et al. | ................. 60/776 |
| 7,581,396 B2 * | 9/2009 | Hsieh et al. | ...................... 60/748 |
| 2002/0162333 A1 * | 11/2002 | Zelina | .............................. 60/776 |
| 2004/0003596 A1 | 1/2004 | Chin et al. | |
| 2005/0257530 A1 | 11/2005 | Zupanc et al. | |

FOREIGN PATENT DOCUMENTS

| | | |
|---|---|---|
| EP | 0 957 311 A2 | 11/1999 |
| EP | 1 245 900 A2 | 10/2002 |
| JP | 1584403 | 2/2005 |

OTHER PUBLICATIONS

U.S. Appl. No. 11/535,667, filed Sep. 27, 2006, Hernandez et al.
U.S. Appl. No. 11/620,269, filed Jan. 5, 2007, Hernandez et al.

* cited by examiner

*Primary Examiner* — Ehud Gartenberg
*Assistant Examiner* — Young Choi
(74) *Attorney, Agent, or Firm* — Oblon, Spivak, McClelland, Maier & Neustadt, L.L.P.

(57) ABSTRACT

A fuel injector including a peripheral atomisation system having a plurality of fuel ejection orifices distributed at regular intervals along the circumference and an annular air eddy deflector. The deflector includes air ejection channels such that, for each fuel ejection axis defined by an ejection orifice, there is a corresponding air ejection channel of which at least the radially most internal part has a median substantially intersecting this fuel ejection axis.

15 Claims, 3 Drawing Sheets

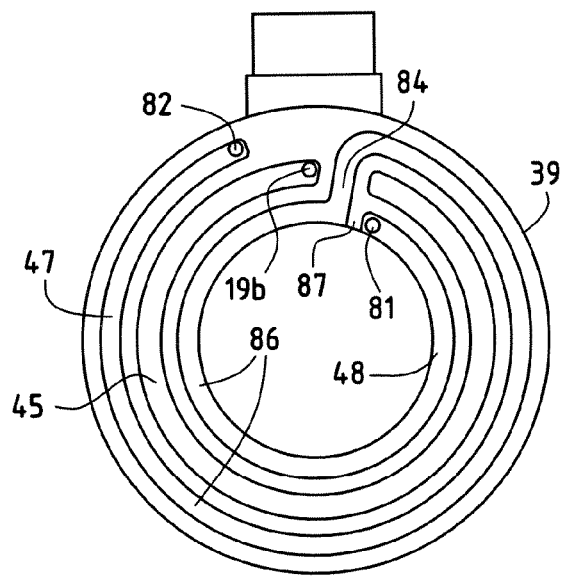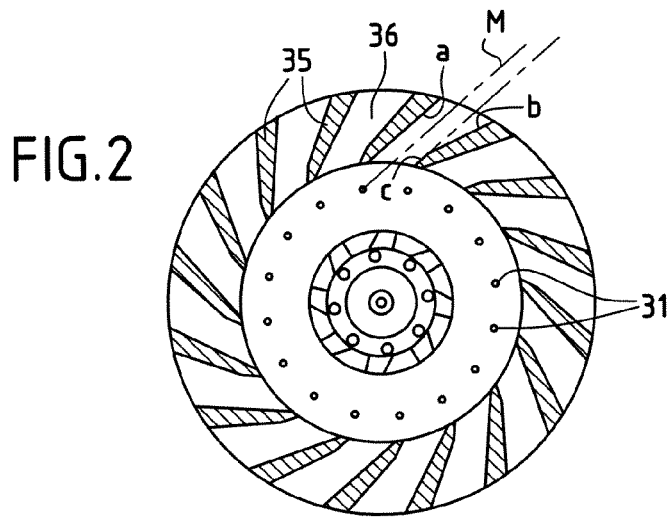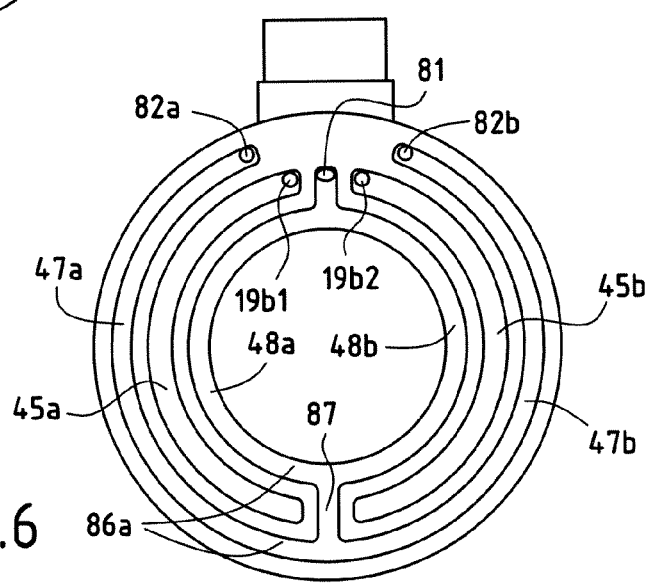

MULTIMODE FUEL INJECTOR FOR COMBUSTION CHAMBERS, IN PARTICULAR OF A JET ENGINE

BACKGROUND OF THE INVENTION

1. Field of the Invention

The invention relates to a multimode fuel injector for combustion chambers, particularly the combustion chamber of a jet engine. More particularly it concerns a refinement making it possible to ensure better peripheral atomisation.

2. Description of the Related Art

The fuel is introduced via several fuel injectors into a traditional combustion chamber of a gas turbine engine. The fuel is mixed with air in each fuel injector before being introduced, then burned in the combustion chamber.

A multimode fuel injector is known, wherein the injection of fuel is differentiated according to the operating speed of the engine. For example, European Patent 1 369 644 describes a fuel injector in which two modes of injection are combined thanks to two coaxial fuel atomisation systems, fed respectively by two fuel distribution circuits, a primary circuit, with relatively low permanent flowrate, which makes it possible to introduce the fuel into a combustion zone, optimised for low engine speeds and a secondary circuit, with intermittent flowrate introducing the fuel into a combustion zone optimised for high engine speeds. For this purpose the atomisation system includes an atomisation head comprising a central nozzle fed by said primary circuit and a peripheral distribution chamber fed by the secondary circuit.

In the first system described, the quality of peripheral atomisation governs the amount of polluting emissions at high engine speed. The invention proposes a multimode fuel injector making it possible to limit the polluting emissions at high engine speed, particularly on takeoff.

BRIEF SUMMARY OF THE INVENTION

More particularly, the invention relates to a multimode fuel injector for combustion chambers, of the type having at least two coaxial fuel atomisation systems, characterized in that a peripheral atomisation system comprises a distributor with annular distribution chamber communicating with a plurality of fuel ejection orifices distributed at regular intervals along the circumference and an annular air eddy deflector, installed radially on the outside relative to said plurality of ejection orifices, in that said deflector comprises vanes defining air ejection channels spaced at regular intervals along the circumference and directing the air towards the fuel jets coming from said ejection orifices and in that, for each fuel ejection axis defined by an ejection orifice, there is a corresponding air ejection channel of which at least the radially most internal part has a median substantially intersecting this fuel ejection axis.

Moreover, to limit the axial footprint of such a fuel injector, said annular deflector comprises two coaxial internally truncated walls, upstream and downstream respectively, with their conicity directed towards the downstream. The annular distribution chamber comprises a truncated wall in which said ejection orifices are provided and the external face of this truncated wall has a generator parallel to or merging with the interior face of the upstream wall of said annular deflector.

In this way the annular distribution chamber engages coaxially inside said annular deflector, which reduces the axial footprint of the atomisation system.

The invention also relates to any combustion chamber equipped with a plurality of multimode fuel injectors according to the above definition.

The invention also covers any jet engine equipped with a combustion chamber of this kind.

The invention will be better understood and other advantages will appear clearer in the light of the description, which will follow, of a multimode fuel injector in accordance with its principle, given purely as an example and intended to be read with reference to the appended drawings, in which:

BRIEF DESCRIPTION OF THE SEVERAL VIEWS OF THE DRAWINGS

FIG. 2 is a section II-II of FIG. 1;

FIG. 3 illustrates the downstream face of the annular body of the fuel injector, obtained by electro-erosion;

FIG. 6 is a view similar to FIG. 3 illustrating an alternative; and

DETAILED DESCRIPTION OF THE INVENTION

Figure 1:
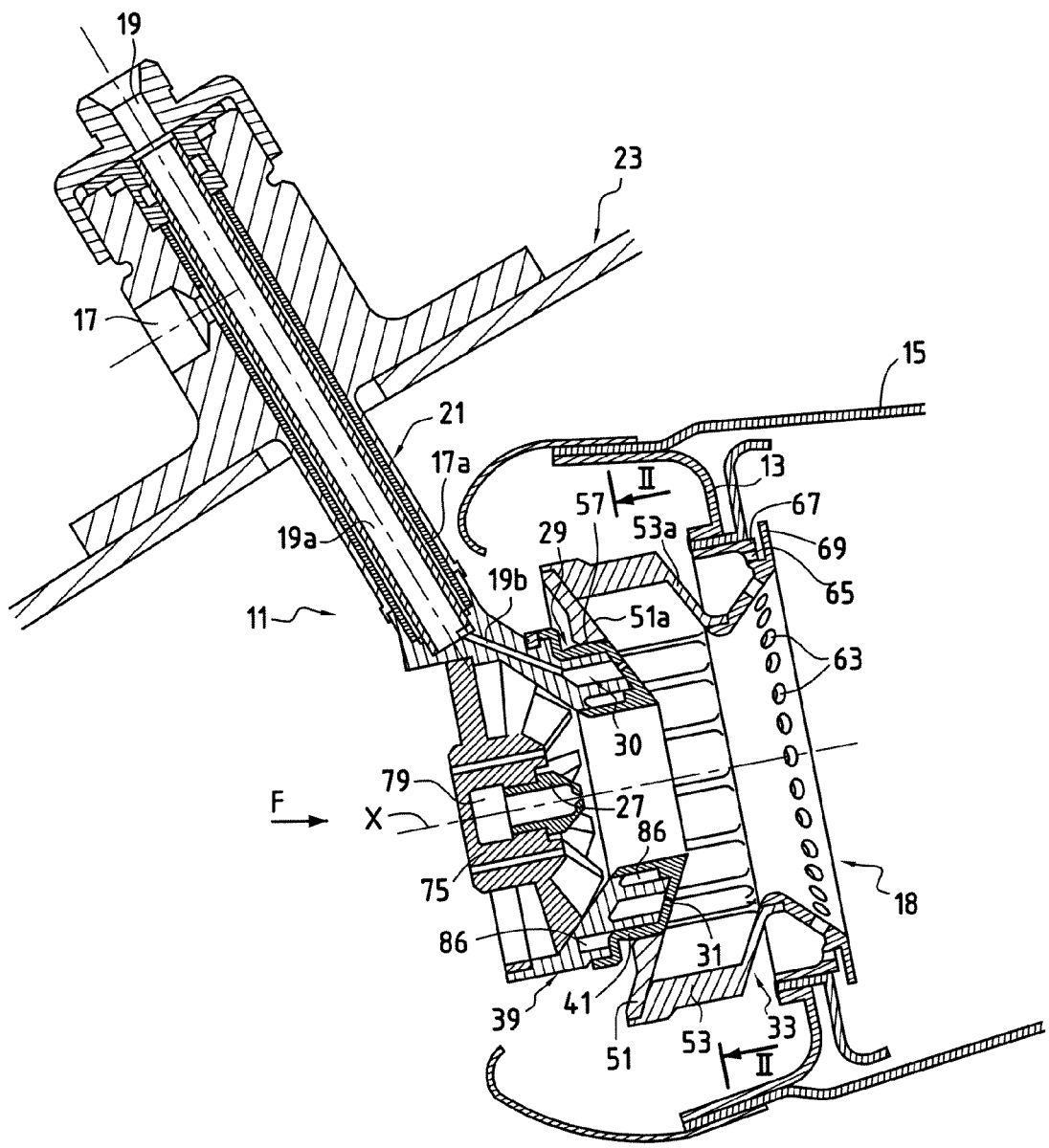
FIG. 1 is a view in elevation and in section of a fuel injector according to the invention.

In FIG. 1, one of the multimode fuel injectors 11 mounted on the back wall 13 of an annular combustion chamber 15 of a turbo engine is schematically illustrated in section. In the example, two modes of injection are combined and the fuel injector described comprises two coaxial fuel atomisation systems, fed respectively by two fuel distribution circuits, a primary circuit 17, here with permanent flowrate and a secondary circuit 19, here with intermittent flowrate.

The two circuits have in common an arm 21 in which are arranged two coaxial passages 17a, 19a, belonging respectively to the primary and secondary circuits, connected to an atomisation head 18. The primary circuit with permanent flowrate has a relatively weak flowrate. It is more particularly adapted to low engine speed.

The secondary circuit 19 with intermittent flowrate is designed to supplement the fuel flowrate up to the point of full throttle, in particular making it possible to attain all the power necessary for takeoff. Its primarily variable flowrate may be zero or very weak at certain engine speeds.

The compressed air coming from a high pressure compressor (not illustrated) circulates in a casing 23 surrounding the combustion chamber 15. The air circulates from upstream towards the downstream, according to the direction of arrow F.

In the rest of the description, the terms "upstream" or "downstream" are used to indicate the position of one element relative to another, in consideration of the flow direction of the gases.

Part of the air penetrates into the combustion chamber 15 passing through the fuel injectors 11. The fuel is mixed with air at the back of the chamber before igniting in said combustion chamber.

In the atomisation head 18, the primary circuit 17 ends in an axial fuel ejection nozzle 27 (here axis X of the atomisation head itself is taken into consideration) while the secondary circuit is connected to a distributor 29 comprising an annular distribution chamber 30, communicating with a plurality of fuel ejection orifices 31, distributed at regular intervals along the circumference at the downstream end of the distributor.

The atomisation head comprises an annular body 39 attached to the arm 21, in which are provided borings belonging to said primary and secondary circuits and connecting the passages 17a 19a to nozzle 27 and the distribution chamber 30, respectively. On FIG. 1, a boring 19b connecting the passage 19a to the distribution chamber 30 can be recognized in particular.

The atomisation head 18 also comprises an annular air eddy deflector 33, commonly called a "swirler", radially installed on the outside relative to said plurality of ejection orifices. This deflector comprises vanes 35 on the circumference, defining between them air ejection channels 36 spaced at regular circumferential intervals and directing the air towards the fuel jets.

Distributor 29 consists of two annular parts, one engaged in the other (and brazed together) and defining between them said distribution chamber 30. One of the parts is the body 39 mentioned above. The other part is an annular flange 41 forming a kind of cover; it is engaged at the downstream end of the body. Orifices 31 are bored in this flange 41. Body 39 and flange 41 comprise cylindrical regions with corresponding diameters, ensuring their centering relative to one another is good. The two parts are assembled by brazing.

As FIG. 3 shows, grooves are engraved on the downstream face of body 39. Groove 45, which is annular overall, defines the essence of the distribution chamber 30, this groove being closed again by flange 41 in order to constitute said chamber 30. The other grooves 47, 48 define a passage section of the primary circuit 17 (they are also closed again by flange 41) and will be described in detail below.

Advantageously, grooves 45, 47, 48 can be obtained by electro-erosion carried out in a single operation on a rough casting of the annular body 39. The shape of the electro-erosion tool corresponds to the configuration of the visible footprints in FIG. 3 and which define these grooves 45, 47, 48.

Figure 4:
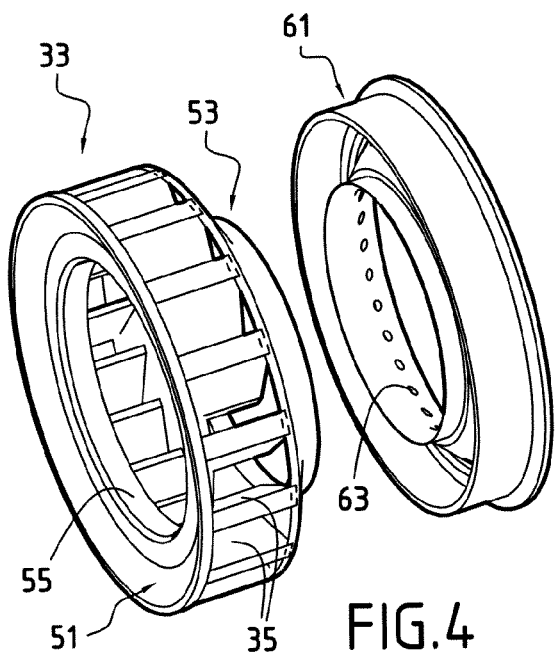
FIG. 4 is an exploded view in perspective of part of the fuel injector.

The annular air eddy deflector 33 is made up of two annular parts 51, 53 assembled by brazing. It is shown in perspective in FIG. 4. The two parts form a kind of squirrel-cage with vanes 35, the thickness of which decreases towards the interior, as illustrated in FIG. 2. The annular part upstream 51 engages in the annular part downstream 53 comprising vanes 35. Part 51, that is to say the upstream wall of the deflector, comprises an interior cylindrical region 55 with diameter equal to the external diameter of a spherical region 57 of flange 41. This spherical region 57 of the distributor engages in the cylindrical region 55 of the deflector. The annular part downstream 53 extends towards the downstream by a divergent conical element 61, traditionally called a bowl, perforated by two series of orifices 63, 65 distributed at regular intervals along the circumference. The orifices 63 are provided on the conical part of element 61. The smaller orifices 65, are provided on an external radial flange 67. They emerge facing a radial deflector 69 (FIG. 1).

Air coming from the compressor hits the back of the chamber and passes through channels 36 and orifices 63, 65, in particular.

As illustrated, the annular deflector 33 composed of two parts 51, 53 comprises two coaxial internally truncated walls 51a, 53a, upstream and downstream respectively. The wall 51a is defined in part 51. The wall 53a is defined in part 53. The conicity of these walls is directed towards the downstream, that is to say their diameter decreases from upstream towards the downstream. The distribution chamber 30 also comprises a truncated wall downstream. It is the wall of the flange 41 in which orifices 31 are provided. The exterior of this wall has a generator parallel to or (as is the case here) merging with the interior face of the upstream wall 51a of the annular deflector.

Advantageously, the angle of conicity of these faces ranges between 45° and 80°.

According to another advantageous feature, the axis of each hole 31 is perpendicular to the generator of surface 51a at this point.

By referring to FIG. 2, one defines a median M for each air ejection channel 36, as being a line which is equidistant from the parallel surfaces of at least its radially most internal part. In the example described, in fact the surface a of one of the vanes 35 is even while surface b of the other vane, adjacent, comprises at least a short internal portion c, parallel to surface a. The median M is therefore equidistant from surfaces a and c. The portion located between a and c constitutes the gauge zone of the air ejection channel in question. Surface b could be merged with the portion c.

According to a significant feature, for each fuel ejection axis defined by an ejection orifice 31, there is an air ejection channel 36 (between two vanes 35) of which at least the radially most internal part (that is to say the gauge zone) has a median M substantially intersecting this fuel ejection axis.

In the example, the number of fuel ejection orifices is equal to the number of air ejection channels. Alternatively the number of air ejection channels may be a multiple of the number of fuel ejection orifices.

Of course, means of indexing (notches and lugs) are provided in such a way as to obtain the configuration of FIG. 2, for the assembly. Distributor 29 makes up part of the fuel injector 11, deflector 33 being assembled at the back of chamber 13 (the fuel injector 11 and back of chamber 13 being orientated by the casing 23). Distributor 29 slides in deflector 33 around surfaces 55 and 57.

This particular configuration, which positions the air channels of the swirler relative to the fuel ejection orifices, makes it possible to optimise atomisation of this fuel. The homogeneity of the air-fuel mixture improves combustion and reduces pollution.

Moreover the incline of the walls 51a, 53a as a result interrupts to a lesser degree the airflow which crosses the air eddy deflector. Also the axial footprint of the device is reduced overall.

Figure 5:
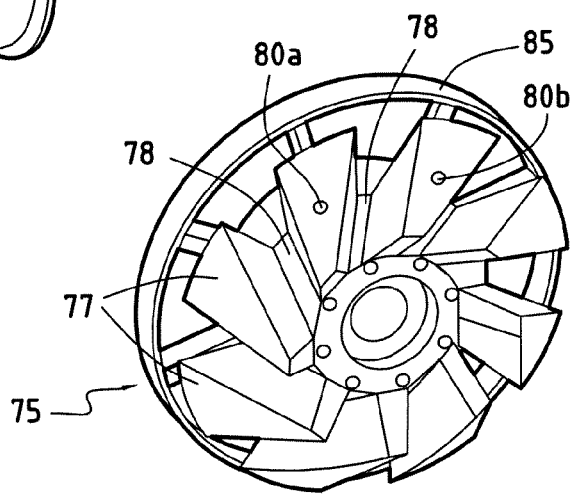
FIG. 5 is a view in perspective for another part of the fuel injector.

The atomisation head 18 also comprises a central part 75 (forming an air eddy deflector), assembled axially inside the annular body 39. This part is illustrated in perspective in FIG. 5. It comprises vanes 77 spaced at regular intervals along the circumference. Throats 78 are thus defined between these vanes. The shape of these is such that the throats are inclined relative to axis X. When the central part is engaged in the annular body 39, throats 78 are closed again radially on the outside and define air ejection channels of another air eddy deflector or "swirler" arranged around nozzle 27.

Part 75 comprises a downstream conical part with its conicity directed towards the downstream, which engages in a corresponding conical part defined in body 39, at its upstream end. Vanes 77 are defined in this conical part, which again reduces the axial footprint (according to X) of the atomisation head 18. In addition, upstream, part 75 comprises a cylindrical region 85, which is aligned in a corresponding cylindrical region defined upstream of body 39, for good centering of part 75 in said body 39. Means of indexing ensure positioning in the circumferential direction between part 75 and body 39.

A closed cavity 79 is defined in the centre of part 75. Nozzle 27 is mounted in this cavity. A passage 80 is provided in a vane 77 and emerges in said cavity 79. It constitutes the final part of the primary circuit. This passage 80 communicates with another boring 81 of the body 39, which emerges at one end of groove 48 (FIG. 3). A boring 82, provided in body 39, connects one end of groove 47 to the end of the passage 17a which belongs to the primary circuit defined above.

According to a remarkable feature, said primary circuit comprises at least one passage section 86 adjacent said distribution chamber 30, for its cooling. Indeed, this passage section 86 is constituted by channels defined by grooves 47, 48 covered by flange 41. In the examples described, said passage section comprises an external annular section (corresponding to groove 47) radially arranged on the outside relative to said distribution chamber and an internal annular section (corresponding to groove 48) radially arranged on the inside relative to said distribution chamber.

In the embodiment in FIG. 3, the configuration obtained by electro-erosion defines a radial passage 84 crossing the groove 45 and establishing the communication between grooves 47 and 48. A radial wall 87 is also defined in the vicinity of the orifice of boring 81, obliging the fuel to flow over practically 360° in the internal annular section. Consequently, in the example in FIG. 3, the two aforementioned annular sections, constituting said passage section 86 of the primary circuit, are connected in series. The fuel of the primary circuit penetrates into this labyrinth through boring 82, circulates around the distribution chamber 30 radially on the outside, then radially on the inside relative to the latter before rejoining cavity 79 via boring 81 then passage 80.

As the flow of fuel in the primary circuit is permanent, cooling of the distribution chamber 30 is ensured under any circumstances, which avoids the phenomena of coking of the fuel in said distribution chamber, which could occur if the flowrate of the secondary circuit is zero or very weak.

FIG. 6 illustrates an alternative of the configuration of the distribution chamber 30 and of said passage section 86a ensuring its cooling.

The distribution chamber comprises two symmetrical parts (defined by two symmetrical grooves 45a, 45b) fed separately by two borings 19b1, 19b2, both connected to passage 19a.

The two annular internal and external sections defined by the grooves, which surround grooves 45a, 45b, each comprise two branches adjacent the two symmetrical parts of the distribution chamber (grooves 45a, 45b) respectively.

The external annular section thus comprises two such symmetrical branches (grooves 47a, 47b), which separately feed two borings 82a, 82b communicating with cavity 79 through the passages 80a and 80b. They meet up around a radial passage 87 arranged between the two symmetrical parts of the distribution chamber and rejoin the internal annular section, which also comprises two symmetrical branches (grooves 48a, 48b) which meet at a point diametrically opposite passage 87, to rejoin the boring 81 fed by passage 17a.

The symmetrical flow of fuel which results from this configuration of said passage section 86a, adjacent the distribution chamber, ensures particularly homogeneous cooling of the latter.

Figure 7:
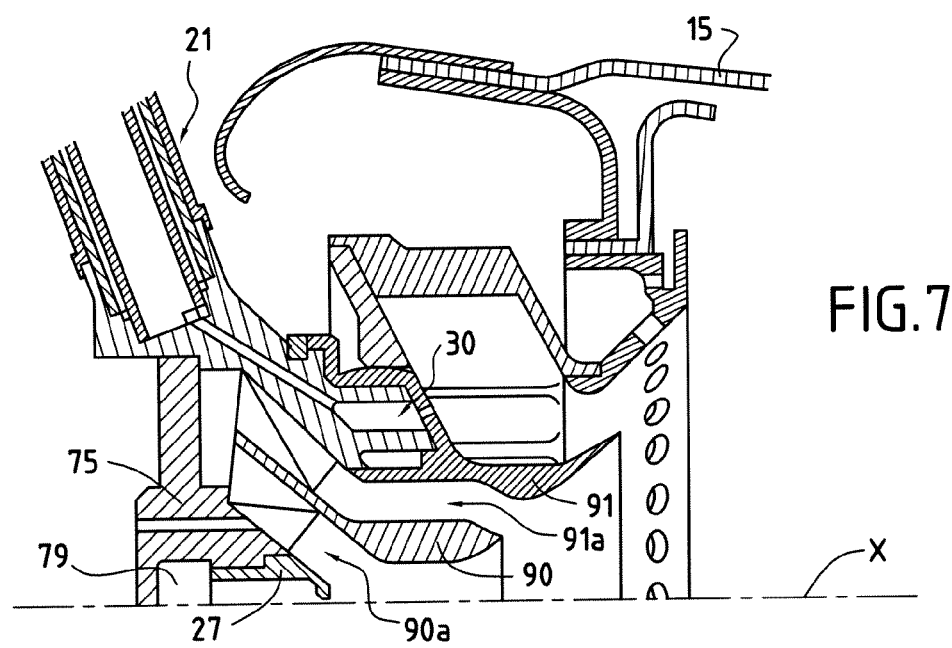
FIG. 7 is a partial half-sectional view similar to FIG. 1, illustrating another alternative.

In the alternative of FIG. 7 where like structural elements are identified by the same reference symbols, the air eddy deflector arranged around nozzle 27 as been modified. This is composed of two axially assembled annular guides 90, 91 defining two counter-rotational "swirlers". In other words, a distinction is made between an internal air eddy deflector 90a and an external air eddy deflector 91a separated by an annular guide 90 shaped to form a Venturi. Another annular guide 91 extends towards the downstream as far as the bowl to avoid interactions with the "swirler" associated with the distribution chamber 30. This arrangement produces an increase in "shearing" in the air flows, which participate in the atomisation of the fuel coming from the nozzle. The fact that the two swirlers defined around the nozzle are counter-rotational assists concentration of the atomisation of the fuel in the vicinity of axis X. The presence of a Venturi makes it possible to accelerate, then slow down the fuel droplets emitted by the nozzle, which greatly supports atomisation of this fuel. The air coming from the external swirler is introduced into the bowl with a component directed towards axis X. The confluence zone of both air flows coming from the two swirlers creates flows with a high degree of turbulence, improving atomisation of the fuel. All in all, this architecture ensures good stability and good performance of the combustion chamber at low engine speed.

The invention claimed is:

1. A multimode fuel injector for combustion chambers, comprising: at least two coaxial fuel atomization system, one of the at least two coaxial fuel atomization systems is a peripheral atomization system, wherein the peripheral atomization system comprises a distributor with an annular distribution chamber communicating with a plurality of fuel ejection orifices distributed at regular intervals along a circumference of the distributor, and an annular air eddy deflector, radially installed on the outside relative to said plurality of fuel ejection orifices, wherein said deflector comprises vanes defining air ejection channels spaced at regular intervals along a circumference of the deflector and directing air towards fuel jets coming from said fuel ejection orifices, for each fuel ejection axis defined by the fuel ejection orifice, at least a radially most internal part of a corresponding air ejection channel has a median which substantially intersects the fuel ejection axis, and wherein said annular deflector comprises two internally truncated coaxial walls, upstream and downstream respectively, with their conicity directed towards the downstream, and said annular distribution chamber comprises a truncated wall in which said orifices are provided and the exterior face of said truncated wall having a frusto-conical surface parallel to or merging with an interior face of said upstream wall of said annular deflector and another atomization system comprising an axial fuel ejection nozzle is provided with another air eddy deflector arranged around this nozzle and two axially assembled annular guide defining counter-rotational swirlers.

2. A fuel injector according to claim 1, wherein the number of fuel ejection orifices is equal to the number of air ejection channels.

3. A fuel injector according to claim 1, wherein the number of air ejection channels is a multiple of the number of fuel ejection orifices.

4. A fuel injector according to claim 1, wherein the angle of conicity of said faces ranges between 45° and 80°.

5. A fuel injector according to claim 1, wherein the upstream wall of said deflector comprises an interior cylindrical region in which a spherical region with diameter corresponding to said distributor is engaged.

6. A fuel injector according to claim 1, wherein said distributor comprises first and second annular parts with cylindrical regions, the first annular part is engaged in the second annular part and said annular distribution chamber is defined between the first annular part and the second annular part.

7. A fuel injector according to claim 6, wherein the first annular part includes an annular body which is attached to an arm which is common to the at least two coaxial fuel atomization systems and the second annular part includes an annular flange which is engaged in a downstream end of the annular body.

8. A fuel injector according to claim 7, wherein grooves are engraved on a downstream face of the annular body.

9. A fuel injector according to claim 7, wherein the truncated wall of the annular distribution chamber is provided on the annular flange of the second annular part.

10. A fuel injector according to claim 9, wherein the annular deflector includes an upstream annular part and a downstream annular part, the upstream annular part includes the upstream wall of the annular deflector and the downstream annular part includes the downstream wall of the annular deflector, and the upstream annular part engages the downstream annular part.

11. A fuel injector according to claim 10, wherein the upstream part includes an interior cylindrical region with a diameter equal to an external diameter of a spherical region of the annular flange of the second annular part, and the spherical region of the annular flange of the second annular part engages in the interior cylindrical region of the upstream part.

12. A fuel injector according to claim 10, wherein the downstream annular part extends towards the downstream by a divergent conical element which is perforated by two series of orifices distributed along a circumference of the divergent conical element.

13. A combustion chamber comprising a plurality of multimode fuel injectors according to claim 1.

14. A jet engine comprising a combustion chamber according to claim 13.

15. A fuel injector according to claim 1, wherein the median is a line which is equidistant from parallel surfaces of the radially most internal part of the air ejection channel.

* * * * *